Aug. 1, 1961  F. K. FLOYD ET AL  2,994,418
MOTION OR TORQUE TRANSMITTING DEVICE AND THE LIKE
Filed June 21, 1957  4 Sheets-Sheet 1

INVENTORS.
FREDERICK K. FLOYD
SANFORD L. SIMONS
JOHN P. MAHONEY, JR.
WALTER VAUGHN
BY Horace B. Van Valkenburgh
ATTORNEY Aug. 1, 1961      F. K. FLOYD ET AL      2,994,418
MOTION OR TORQUE TRANSMITTING DEVICE AND THE LIKE
Filed June 21, 1957      4 Sheets-Sheet 2

INVENTORS.
FREDERICK K. FLOYD
SANFORD L. SIMONS
JOHN P. MAHONEY, JR.
WALTER VAUGHN
BY Horace B. Van Valkenburgh
ATTORNEY Aug. 1, 1961  F. K. FLOYD ET AL  2,994,418
MOTION OR TORQUE TRANSMITTING DEVICE AND THE LIKE
Filed June 21, 1957

INVENTORS.
FREDERICK K. FLOYD
SANFORD L. SIMONS
JOHN P. MAHONEY, JR.
WALTER VAUGHN

BY Horace B. Van Valkenburgh
ATTORNEY

Aug. 1, 1961   F. K. FLOYD ET AL   2,994,418
MOTION OR TORQUE TRANSMITTING DEVICE AND THE LIKE
Filed June 21, 1957   4 Sheets-Sheet 4

INVENTOR.
FREDERICK K. FLOYD
SANFORD L. SIMONS
JOHN P. MAHONEY, JR.
WALTER VAUGHN
BY Horace B. Van Valkenburgh
ATTORNEY

United States Patent Office 2,994,418
Patented Aug. 1, 1961

2,994,418
MOTION OR TORQUE TRANSMITTING DEVICE AND THE LIKE
Frederick K. Floyd, Denver, Sanford L. Simons, Turkey Creek, John P. Mahoney, Jr., Wheatridge, and Walter Vaughn, Littleton, Colo., assignors to Metron Instrument Company, Denver, Colo., a corporation of Colorado
Filed June 21, 1957, Ser. No. 667,222
20 Claims. (Cl. 192—35)

This invention relates to motion or torque transmitting devices and the like, and more particularly to such a device which may be used as a clutch, brake, coupling, torque amplifier, speed control device or the like.

Among the objects of this invention are to provide a novel motion or torque transmission device; to provide such a device which is particularly adapted to be utilized as a clutch; to provide such a clutch which is positive in action yet requires a minimum of force to produce engagement or disengagement; to provide such a clutch which may be used as a centrifugal clutch, a single revolution clutch, an overload clutch or other type of clutch; to provide such a device which may also be used as a brake, particularly a brake in which the braking effect is considerably greater than the force or torque required to initiate or release the brake; to provide such a brake which may be used as a more conventional brake or as a centrifugal brake; to provide such a device which may be utilized as a torque amplifier, in which a comparatively small and/or controlling torque may be used in applying a considerably greater torque to a shaft or the like; to provide such a device which may be used as a coupling to connect and disconnect two rotating or rotatable parts, such as shafts; to provide such a device which may be actuated through electrical or mechanical means; to provide such a device in which rotating elements may be used which tend to be balanced about a central axis and which may be made rigid to minimize or eliminate the effect of centrifugal force; to provide such a device which may exist in any one of several different forms; and to provide such a device which is comparatively simple in construction yet effective in operation.

Additional objects and the novel features of this invention will become apparent from the description which follows, taken in connection with the accompanying drawings, in which.

In general, a device constructed in accordance with this invention, for transmitting motion or torque between two substantially concentric members, such as shafts, at least one of which is rotatable, includes a series of generally flat elements mounted in side by side relation for rotation generally about a common axis, each of the elements having at least one friction edge. The last element of the series is pivotally connected, at a point spaced from the above axis, with one of the members, while a cylindrical friction surface is connected to the other member, the cylindrical friction surface being either an interior or exterior surface. Pivotal connections, such as diametrically opposite each other in turn and which are spaced from the above axis, are provided between successive elements of the series for producing displacement in a generally circumferential direction and also in a generally radial direction of an element with respect to the common axis, such radial displacement causing the friction edge of each successive element, in turn, to engage the friction surface. In addition, to produce such engagement of the friction edges of the elements with the cylindrical friction surface, suitable actuating means, such as operated electrically or mechanically, is mounted for at least limited rotation relative to the aforesaid common axis, and a connection, spaced from the axis and between such means and the first of the series of elements, is provided so as to produce a generally circumferential and generally radial displacement of the first element and then the remaining elements of the series in succession. The elements may be annular discs, in which case the friction edges may be the outer edges of the discs in the event that the cylindrical friction surface surrounds the elements, or may be the inner edges of the discs in the event that the elements surround the friction surface. In addition, a friction edge of an element may be an arcuate edge of a lateral or angular extension, flange, lug or the like, of the element, while an element may be provided with two or more friction edges, such as to engage the friction surface simultaneously, or to engage the friction surface when displaced in one or the other direction, respectively, about the pivotal connection to the next element in the series. Thus, the elements may be constructed so as to transmit torque or motion in one direction only, or in either direction. Also, the elements may be so proportioned that the mechanical advantage in one direction is greater than in the opposite direction, while the elements may also be so proportioned that different elements may transmit different amounts of torque. A resilient device or means for restoring the elements to neutral or unengaged position may also be utilized.

Figure 1:
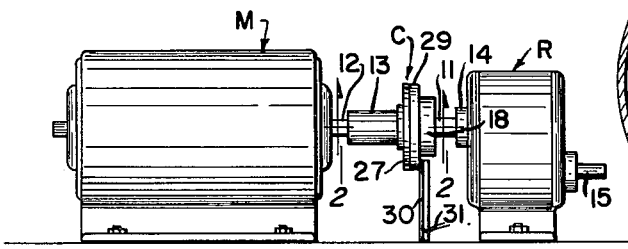
FIG. 1 is a side elevation of a motor and a speed reducer connected by an electrically operated clutch constructed in accordance with this invention.
Figure 3:
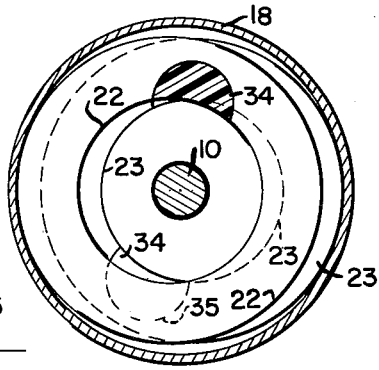
FIG. 3 is a further enlarged cross-section taken along line 3—3 of FIG. 2.

Apparatus constructed in accordance with this invention, as in FIGS. 1–5, may comprise a clutch C connecting a motor M with a speed reducer R. As in FIG. 2, the above concentric members may be clutch shafts 10 and 11, respectively, the former being conveniently connected to the motor shaft 12 by a coupling 13 and the latter connected to an input coupling 14 of the speed reducer R, while an output shaft 15 of the speed reducer R may be connected to any device or mechanism desired. As will be evident, the clutch shaft 10 is a rotating member, since it is driven from motor M, and is provided with a radial flange 16 disposed adjacent a radial flange 17 of the shaft 11 which is provided with a circumferential, cylindrical flange 18, the inner surface of which comprises the cylindrical friction surface. The clutch C also includes a series of pivotally connected elements, such as discs 20 to 24, inclusive, each constructed in a manner similar to disc D of FIGS. 4 and 5, described below, with disc 24 being pivotally connected to flange 16, as by a pin 25, and disc 20 being pivotally connected, as by a pin 26, with an annular plate 27. The plate 27 may be moved into frictional engagement with the end of the cylindrical flange 18 by an electromagnetic coil 28, which may be mounted in stationary position by an angular bracket 29 supported by a post 30 and energized by electricity supplied through the wires 31 of FIG. 1, when the clutch is to be actuated. Plate 27 is, of course, formed of magnetic material, such as steel, but the discs 20—24 may be of any desired material, such as metal, plastic or the like. Thus, the discs can conveniently be cast, forged, stamped or machined if made of metal, or molded or formed in any other suitable manner, if made of plastic. Plate 27 may be provided at its inner edge with a bearing 32 to permit axial as well as a degree of rotational movement relative to the shaft 10. As will be evident, when electromagnet 28 is energized, the plate 27 will be moved toward the end of cylindrical flange 18, for frictional engagement therewith, so that the plate 27, which rotates with shaft 10, will be slowed down and will thereby move pin 26 to cause the discs 20—24 to be successively displaced both circumferentially and radially and thereby cause the outer edges of the discs to engage the inner friction surface of the cylindrical flange 18, as indicated in FIG. 3.

Figures 2, 4, 5:
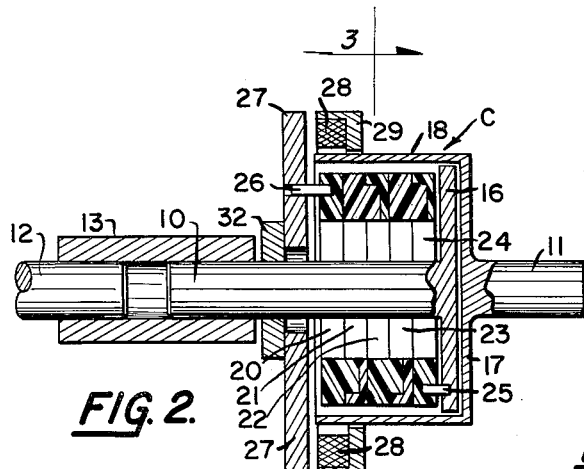
FIG. 2 is an enlarged, fragmentary longitudinal section taken along line 2—2 of FIG. 1.
FIG. 4 is an end elevation of a disc typical of a series of discs of the clutch of FIGS. 2 and 3.
FIG. 5 is a side elevation of the disc of FIG. 4.

Each of the annular discs 20—24 may, as indicated previously, be constructed in a manner similar to disc D of FIGS. 4 and 5, whose outer edge 33 is a friction edge and which is provided with a laterally extending lug 34 whose cross section is a portion of a circle and is provided with a recess 35 conveniently diametrically opposite the lug 34 and corresponding in configuration to the lug 34, although recess 35 may, if desired, extend through the disc as a slot. The inner diameter of disc D and of discs 20—24 is, of course, sufficient to clear shaft 10 when the discs are displaced, as to the position of FIG. 3. As will be evident, lug 34 of one disc fits into the recess 35 of the next adjacent disc, to provide diametrically opposed pivotal connections between successive discs. It is unnecessary for disc 20 to be provided with a recess 35 or disc 24 to be provided with a lug 34, since pin 26 is located at the position which lug 34 of disc 20 would occupy, if present, while pin 25 is located at the position which recess 35 of disc 24 would be located, if present. When disc 27 is slowed down and pin 26 rotates relative to shaft 10, disc 20 will pivot about lug 34 of disc 21 and each disc 21, 22 and 23, in succession, will similarly pivot about the lug 34 of the next disc, until disc 24 pivots about pin 25. Such movement of the discs will cause the discs to be displaced both circumferentially and radially, since the pivotal connections between the discs are spaced from the axis of shaft 10, about which the discs rotate. In this manner, the discs will be forced outwardly against the inner friction surface of cylindrical flange 18 and cause flange 18 to be rotated with shaft 10 which, of course, will rotate shaft 11 and thus drive speed reducer R, or any other desired device or mechanism connected to shaft 11. It will be noted that, in using discs similar to the disc D of FIGS. 4 and 5, such as the discs 20—24, the discs should be assembled so that the lug 34 of one disc, such as disc 20, engages a recess 35 of the next disc, such as disc 21, i.e., the lugs "point" from input to output, since if the discs were assembled in the opposite relation, a recess 35 of a preceeding disc, for instance, might tend to move radially away from the lug 34 of the next disc.

As will be evident, shaft 11 of FIG. 2 may be the driving shaft and shaft 10 the driven shaft, in which event the plate 27 and discs 20—24 will remain stationary until coil 28 is energized to cause plate 27 to engage the end of flange 18 and start to rotate with it, thereby causing the discs to pivot about the respective lugs and the clutch to engage. As will be evident from FIG. 3, the effective outer diameter of the series of discs increases upon such movement while the effective inner diameter simultaneously decreases, so that the friction surface to be engaged by the discs may be disposed within the same. As will be evident, in the event that shaft 10 or flange 18 is fixed, the clutch C may be instead used as a brake. The device of this invention may also be utilized as a torque amplifier, since the torque or force necessary to hold plate 27 against the end of flange 18, for instance, may be only a fraction of the torque transmitted by the device. Thus, considering that $T=FA$, where T is the torque transmitted from the driving shaft to the driven shaft, F is the torque produced by friction between plate 27 and the end of flange 18, and A is the amplification factor, the following formula will be applicable theoretically to the construction of FIGS. 1–5:

(I) $$A=\left(\frac{R+u}{R-u}\right)^n$$

where:

$$R=\frac{r_p}{r_d}$$

$r_d$=radius of cylindrical friction surface.
$r_p$=radius to center of pins 25 and 26, lugs 34 and recesses 35.
$n$=number of discs.
$u$=coefficient of friction between the outer edges of discs 20–24 and the inside of flange 18.

As will be evident from the above formula, which applies when the direction of friction drag on the discs is in the same rotational direction as F or the input torque, the amplification factor, provided R is greater than $u$, may be increased by a decrease in the ratio between the radius to the pivotal connections and the radius of the frictional surface, or by an increase in the coefficient of friction, and also by an increase in the number of discs, the latter increasing exponentially. Thus, the torque amplification factor may be increased or decreased as desired. Also, if R is made equal to $u$, the amplification factor is theoretically infinite; while it may sometimes be desirable to make the clutch self-locking, i.e., so that a positive force will be required to cause the discs or elements to disengage from the friction surface. As will be evident, the locking situation is produced when R in the formula is less than $u$, so that the amplification factor becomes negative in sign, although numerically any desired value.

Figure 6:
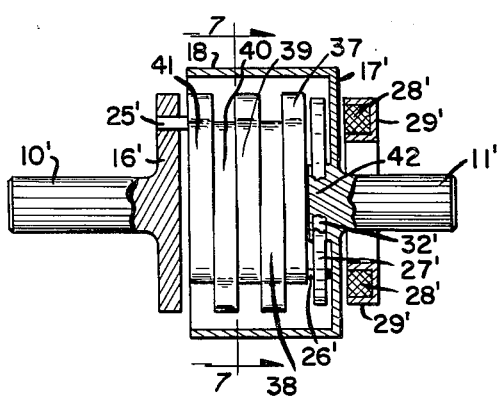
FIG. 6 is a side elevation, partly broken away to show the interior construction, of an alternative form of clutch also constructed in accordance with this invention.
Figure 7:
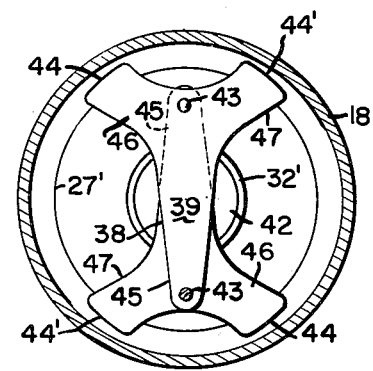
FIG. 7 is a slightly enlarged cross section, taken along line 7—7 of FIG. 6.

In the embodiment of this invention illustrated in FIGS. 6 and 7, either shaft 10′ or shaft 11′ may be the driving shaft, and the other shaft the driven shaft. Shaft 11′ may be provided with a radial flange 17′ connected at its outer edge to a cylindrical flange 18, the inner surface of which is a cylindrical friction surface, while shaft 10′ may be provided with a radial flange 16′, connected by a pin 25′ with the last element 41 of a series of elements 37—41 inclusive, the first element 37 being connected by a pin 26′ with an annular plate 27′ which may be provided with a bearing 32′ for sliding and rotation about an axial extension 42 of shaft 11′. Plate 27′ may be attracted toward flange 17′ by an electromagnetic coil 28′, conveniently mounted in fixed position in a bracket 29′. As will be evident, plate 27′ should be formed of magnetic material, such as steel, and radial flange 17′ should be formed of non-magnetic material, while elements 37 to 41 may be formed of metal, plastic or any other suitable material. Each of elements 37—41 is connected to the next element in the series by a pin 43, as in FIG. 7, so that when plate 27′ is caused either to slow down by frictional engagement with flange 17′, as when shaft 10′ is the driving shaft, or to begin rotation, as when shaft 11′ is the driving shaft, pin 26′ will cause element 37 to pivot about pin 43 which connects element 37 with element 38, and similarly each of the elements will in turn pivot about pin 43 connecting it with the next succeeding element, so that the friction edges 44 or 44′ of the elements will engage the cylindrical friction surface on the inside of cylindrical flange 18, as in FIG. 8. In the event shaft 10′ is the driving shaft, such frictional engagement of the elements with the inside of flange 18 will cause flange 18 and shaft 11′ to be rotated with shaft 10′, while if shaft 11′ is the driving shaft, such engagement will drive shaft 10′ through pin 25′.

Figure 8:
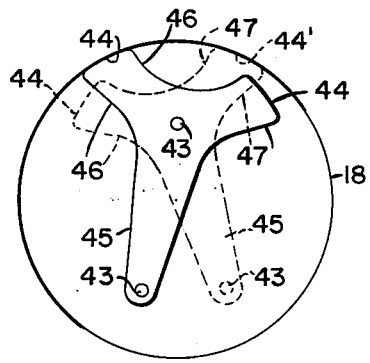
FIG. 8 is a diagram of the action of one of a series of friction elements of FIGS. 6 and 7.

Each of elements 37—41 may be constructed in the manner shown in FIG. 7, such as being provided with a radial leg 45 adjacent the outer end of which is located a hole to receive the pin 43 which connects the element with the next preceding element, such as the pin 43 shown in full in FIG. 7, which connects element 39 with element 38, and a diametrically opposite hole which receives the pin 43 connecting the element with the next successive element, such as pin 43 shown in section in FIG. 7, which connects element 39 with element 40. Each of the elements 37 to 41 may also be provided with a pair of angularly extending lugs 46 and 47 which diverge from each other opposite leg 45 and which may be provided with the arcuate friction edges 44 and 44′, respectively. As will be evident from FIG. 8, when the pin 43 adjacent the end of leg 45 is moved, the element will pivot about the opposite pin 43, so that the friction surface 44 of the lug 46 will engage the inner periphery of flange 18 or cylindrical friction surface, indicated diagrammatically in FIG. 8, when leg 45 is moved in one direction as in the full position of FIG. 8, while when leg 45 is moved in the opposite direction, the friction surface 44′ of lug 47 will engage the cylindrical friction surface, as in the dotted position of FIG. 8. Thus, with elements as shown in FIGS. 7 and 8, the clutch is operative in either direction. It will be understood, of course, that each pin 43 does not remain in a diametrically opposite position to the next preceding and succeeding pins 43, since as the various elements are displaced, the position of pins 43 will shift circumferentially as well as radially. Thus, when one element is shifted to engage the surface and thereby displace the next successive element, the pin 43 shown in the upper position in FIG. 8 will itself shift, so that the ultimate position of the elements will be a staggered relationship around the inner periphery of the flange 18.

The elements may have other and different shapes and leverage arrangements and also may be so constructed that the clutch will operate in one direction only. Thus, as in FIGS. 9 and 10, a series of elements, such as including elements 48 and 49, may each be provided with a radial leg 50, adjacent the outer end of which is a hole for receiving a pin 43 connected to the next preceeding element in series, i.e., the input for the element involved, with a diametrically opposite hole for a pin 43 connected to the next succeeding element in the series, and an offset lug 51 having an arcuate friction edge 52 which will engage the inner periphery of the cylindrical friction surface when pivoted about the opposite pin 43 through movement of leg 50 by input 43, as in FIG. 10. Additional elements will similarly be displaced so that the friction edges 52 thereof will engage the cylindrical friction surface. Or, the elements may be constructed to provide a different leverage arrangement, as in FIG. 11, in which an element 54 is connected by a pin 43, the lower pin shown or input pin, with the next preceeding element and an element 55 is connected by a pin 43, the upper pin shown, with element 54. Each of the elements, such as elements 54 and 55, may be provided with a radial leg 56 adjacent the outer end of which a hole for a pin 43 may be located and also with an angular leg 57 provided with an arcuate friction edge 58. As will be evident, when the lower pin 43 of FIG. 11 is moved, as by the next preceeding element, the element 54 will pivot about the upper pin 43 to cause its friction edge 58 to engage the inside of flange 18, while when element 54 is so displaced, the upper pin 43 will cause element 55 to pivot about the pin 43 connecting it with the next succeeding element, and so on until all of the elements have engaged the cylindrical surface of the inside of flange 18. Or, the elements may be constructed in a manner similar to element 60 of FIG. 12, which may be provided with oppositely extending, radial flanges 61 and 62 respectively, provided with holes 63 and 63′ for pins adapted to connect the element with the next succeeding and next preceeding element, respectively. The element 60 may also be provided with a lateral flange 64 having a friction edge 65 adapted to engage cylindrical friction surface 18 when element 60 is pivoted about the pin in hole 63 by movement imparted through the pin in hole 63, as in FIG. 13.

Figure 9:
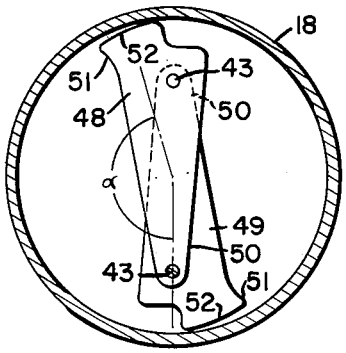
FIG. 9 is a cross section, similar to FIG. 7, but showing an alternative form of element.
Figure 10:
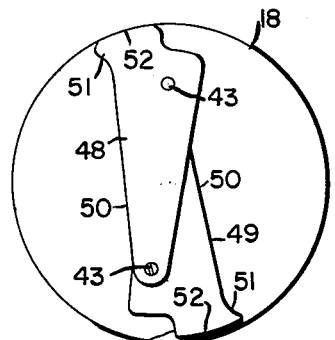
FIG. 10 is a diagram of the operation of the elements of FIG. 9.
Figure 11:
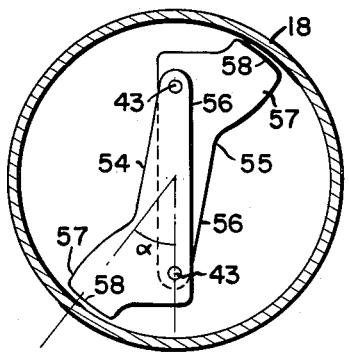
FIG. 11 is a cross section, similar to FIG. 7, but illustrating a further alternative type of element.
Figure 12:
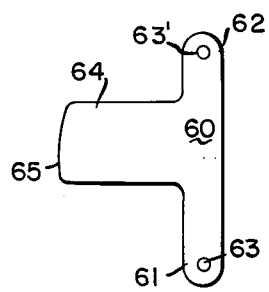
FIG. 12 is a side elevation of a further alternative type of element.
Figure 13:
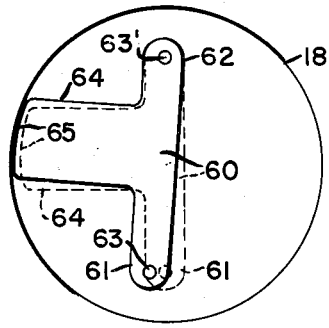
FIG. 13 is a diagram of the operation of the element of FIG. 12.

It will be noted that the friction edges 44 and 44′ of FIGS. 7 and 8, the friction edge 52 of FIGS. 9 and 10, the friction edges 58 of FIG. 11 and the friction edges 65 of FIGS. 12 and 13, may have a radius corresponding to that of the inner surfaces of the flange 18, so that a greater bearing surface may be provided than in the case of the outer edge of an annular disc having a smaller diameter than flange 18, as in the case of the discs 20—24 of FIGS. 2 and 3. Of course, during use, discs 20—24 may wear slightly so that an arcuate segment is produced thereon which corresponds to the inside diameter of flange 18, so that a greater bearing surface is thereby obtained. It will also be noted that while the elements of FIGS. 6–8 can be operated in either direction, the elements of FIGS. 9–13 are designed for use in one direction of rotation only. It will further be noted that the individual elements of FIGS. 6–8 and FIGS. 9 and 10 operate as first class levers, whereas the elements of FIGS. 12 and 13 operate as second class levers and the elements of FIG. 11 operate as third class levers, with a consequent difference in the force exerted which presses the friction edge against the cylindrical friction surface by the actuating pin or the like. As will be evident, it is possible to use combinations of different elements in the same series.

Figure 14:
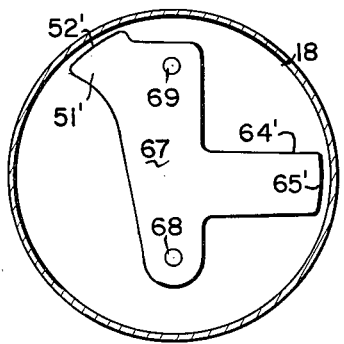
FIG. 14 is a cross section similar to FIG. 7, but illustrating a still further alternative type of element.
Figure 15:
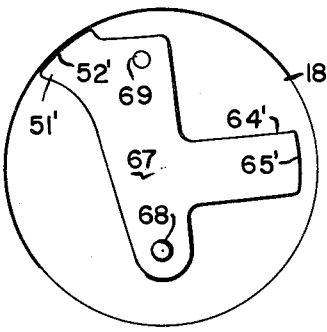
FIGS. 15 and 16 are diagrams representing the operation of the element of FIG. 14, when moved in opposite directions.
Figure 16:
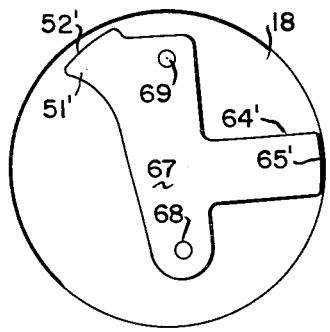

Elements may also be used which operate to apply a greater force against the friction surface in one direction than in the opposite direction, such as by the use of first and second class lever arrangements. One example of the same is illustrated in FIGS. 14–16, in which an element 67 may be provided with an angular flange 51′ provided with a friction edge 52′ and a slightly off-center, lateral flange 64′ provided with a friction edge 65′. Such element may also be provided with oppositely disposed holes 68 and 69 for receiving pins adapted to connect the element with the next adjacent element, or any other suitable type of pivotal connection. As in FIG. 15, when the pin in hole 68 is connected to the next preceeding element in series, movement of this pin in one direction will cause element 67 to pivot about the pin in hole 69, so that friction edge 52′ will be pressed into engagement with the cylindrical friction surface 18, while when the pin in hole 68 is moved in the opposite direction, the friction edge 65′ will be pressed against the cylindrical friction surface 18, as in FIG. 16. In the event the pin in hole 69 is connected to the next preceding element, the leverage factor will, of course, be altered. The friction edge which will engage the cylindrical friction surface will also depend upon the arrangement of the elements and also upon which element is attached to a relatively fixed pivot, such as pin 25′ of FIG. 6, and which element is pivotally connected to the actuating means, such as plate 27′ of FIG. 6.

The following formula is theoretically applicable to the constructions of FIGS. 6 to 16, inclusive, where $T=FA$ and T, F and A are defined as previously given:

(II) $$A=\left(\frac{R(\sin \alpha - u \cos \alpha)+u}{R(\sin \alpha - u \cos \alpha)-u}\right)^n$$

where:

$$R=\frac{r_p}{r_d}$$

$r_d$=radius of cylindrical friction surface.
$r_p$=radius to center of pins.
$\alpha$=angle between radius to pin by which element is moved and radius to point of friction contact (as shown in dot-dash lines in FIGS. 9 and 11)
$u$=coefficient of friction between friction edges and friction surface.
$n$=number of elements.

As before, the torque amplification factor may be increased or decreased by changes in the above factors. Also, any of the elements shown in FIGS. 6 to 16 may be enlarged at the center and provided with a central hole, so that a shaft or a restoring device may extend therethrough, or for other purposes.

Figure 17:
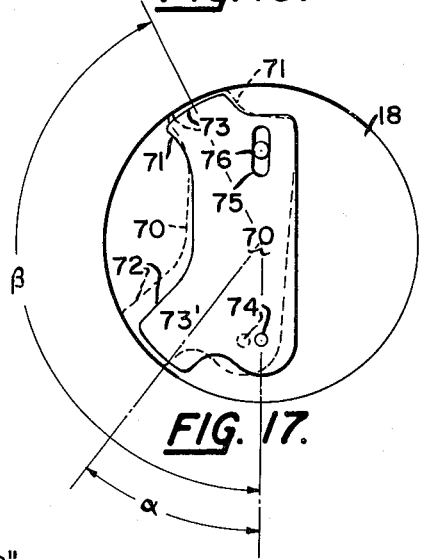
FIG. 17 is a diagram of the operation of a still further alternative type of element.

Again, the elements may be so constructed that more than one friction edge will simultaneously engage the cylindrical friction surface, as in the case of the element 70 of FIG. 17, which is provided with angular lugs 71 and 72 on the same side but extending in generally opposite directions and provided with friction edges 73 and 73′ respectively. Adjacent one end, element 70 may be provided with a hole 74 for receiving an input pin providing a connection with the next preceding element, and at the opposite end with a slot 75 receiving a pin 76 mounted on the next succeeding element. As will be evident, when the pin in hole 74 moves from the full to the dotted position of FIG. 17, the friction surfaces 73 and 73′ will both be pressed against the cylindrical friction surface 18, while the slot 75 permits the translation necessary for both friction edges to engage.

The following formula is theoretically applicable to the construction of FIG. 17, where $T=FA$ and T, F and A are defined as previously given:

(III)

$$A=\left[\frac{R\cdot\frac{(1+u^2)(\sin\alpha\cos\beta-\sin\beta\cos\alpha)}{\cos\beta+u\sin\beta-\cos\alpha+u\sin\alpha}+u}{R\cdot\frac{(1-u^2)(\sin\alpha\cos\beta-\sin\beta\cos\alpha)}{\cos\beta+u\sin\beta-\cos\alpha+u\sin\alpha}-u}\right]^n$$

where:

$$R=\frac{r_p}{r_d}$$

$r_d$=radius of cylindrical friction surfaces.
$r_p$=radius to center of pins.
$\alpha$=angle between radius to input pin and radius to one friction surface, as in FIG. 17.
$\beta$=angle between radius to input pin and radius to second friction surface, as in FIG. 17.
$u$=coefficient of friction between friction edges and friction surface.
$n$=number of elements.

As before, the torque amplification may be increased or decreased by changing various factors appropriately.

Figure 18:
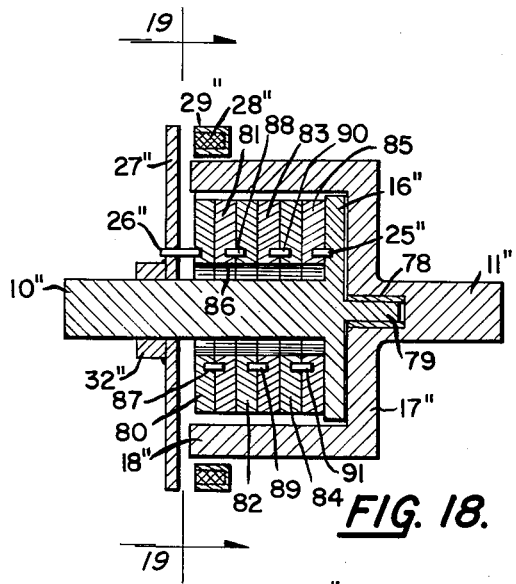
FIG. 18 is a longitudinal section of an electrically actuated clutch constructed in accordance with and forming another embodiment of this invention.
Figure 19:
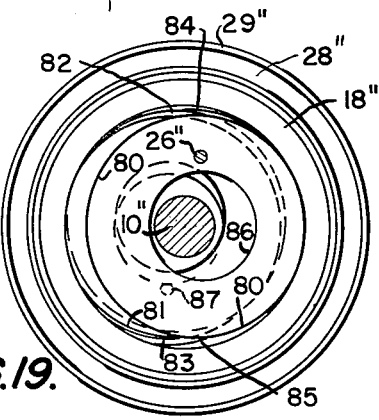
FIG. 19 is a cross section taken along line 19—19 of FIG. 18.

As illustrated in FIGS. 18 and 19, a clutch constructed in accordance with this invention may be adapted to connect a driving shaft 11″ with a driven shaft 10″, the driving shaft 11″ being conveniently provided with a radial flange 17″ extending to and connected with a circumferential flange 18″ which provides a cylindrical friction surface on the inside thereof. The shaft 11″ may also be provided with a sleeve bearing 78 adapted to receive an extension 79 of the shaft 10″, the latter being provided with a radial flange 16″ adjacent flange 17″. A series of discs 80 to 85, inclusive, are disposed around shaft 10″ and each disc is provided with a central hole 86 having a sufficient diameter to clear shaft 10″ upon movement, as described later, when the outer edge of each of the discs engages the inside of flange 18″. Disc 80 may be connected by a pivot pin 26″ with a plate 27″ which is conveniently mounted on a bearing 32″ for both axial and radial movement relative to shaft 10″. The plate 27″ may extend beyond the flange 18″, thus having a greater diameter than the latter, and is formed of magnetic material so that it may be attracted toward the end of flange 18″ by an electromagnetic coil 28″ mounted in a fixed bracket 29″ disposed in circumferentially spaced relation around the periphery of flange 18″.

Disc 80 may be connected to disc 81 by a pivot pin 87 disposed normally diametrically opposite pivot pin 26″, while disc 81 may be connected to disc 82 by a pivot pin 88, in turn normally diametrically opposite pin 87. Similarly, pivot pins 89, 90 and 91 may be disposed in successive normally diametrically opposed positions to connect succeeding discs 82 to 85, inclusive, and finally, disc 85 may be connected by a pivot pin 25″, normally diametrically opposite the pin 91, with radial flange 16″ of shaft 10″.

With shaft 11″ rotating and shaft 10″ stationary, as long as plate 27″ clears the end of flange 18″, shaft 10″ will remain stationary. However, upon energization of electromagnetic coil 28″, plate 27″ will be attracted toward the end of flange 18″, and as soon as it engages the end of flange 18″, friction will cause plate 27″ to start to rotate with flange 18″. Such radial movement of plate 27″ will shift pivot pin 26″, causing disc 80 to pivot about pin 87, as to the position of FIG. 19, and the outer edge thereof will engage the inside of flange 18″. Also, as plate 27″ moves further around with flange 18″, the movement of disc 80, accompanied by the movement of pin 87, will cause disc 81 to pivot about the pin 88 and the outer edge thereof will engage the inside of flange 11. Similarly, the remaining discs 82, 83, 84 and 85 will pivot about the respective pins 89, 90, 91 and 25″, until the outer edge of each disc engages the inner periphery of flange 18″, as in FIG. 19. The frictional engagement of a plurality of discs with the inner periphery of flange 18″ will cause the discs to rotate with flange 18″ and, through pin 25″, rotate flange 16″ and thereby cause shaft 10″ to rotate. As will be evident, the amount of force necessary to hold plate 27″ against the end of flange 18″, i.e., to produce sufficient friction to cause discs 80 to 85 to pivot about the respective pins 87 to 91 and 25″, is relatively small compared with the driving force or torque which will be transmitted through the discs to the driven shaft 10″. As will also be evident, shaft 10″ may be the driving shaft and the shaft 11″ may be the driven shaft, in which event the discs 80 to 85 and the plate 27″ will rotate with shaft 10″ until the electromagnetic coil 28″ is energized to move the plate 27″ into engagement with the end of flange 18″, thereby slowing the plate 27″ and causing discs 80 to 85 to pivot about the respective pins, but in the opposite direction from that indicated in FIG. 19. Of course, if the direction of rotation of the driving shaft is reversed, the discs will pivot in the opposite direction. Also, if shaft 10″ is fixed, i.e., held against rotation, the discs will act as a brake to slow down or stop shaft 11″. Shaft 10″ may, of course, be a rotating shaft and shaft 11″ a fixed shaft, to produce a braking effect, in a similar manner, for shaft 10″.

Plate 27″ of FIG. 18 may be actuated mechanically rather than electrically. For instance, bearing collar 32″ of FIG. 18 may be connected to a forked lever adapted, in a manner similar to many conventional clutches, to move plate 27″ into and out of engagement with the end of flange 18″. Also, plate 27 of FIG. 2 may similarly be actuated mechanically.

Figure 20:
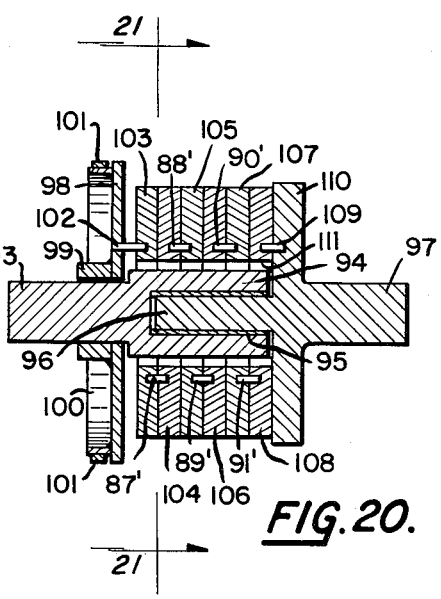
FIG. 20 is a longitudinal section of a mechanically operated clutch constructed in accordance with this invention and forming a further embodiment thereof.
Figure 21:
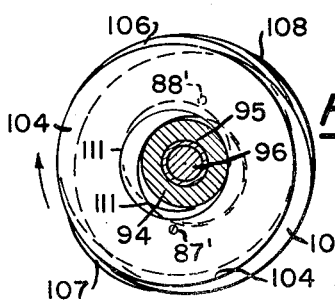
FIG. 21 is a cross section taken along line 21—21 of FIG. 20.

In the embodiment of this invention illustrated in FIGS. 20 and 21, a driven shaft 93 may be provided with a boss 94 having a central socket in which is installed a sleeve bearing 95 for an extension 96 of a driving shaft 97, so that shaft 97 may rotate relative to shaft 93. A plate 98 may be mounted on a bearing collar 99 for rotation and axial movement relative to shaft 93 and may be provided with a flange 100 adapted to be engaged by a brake band 101, which may instead be a drive belt, if the device is to be used as an overrunning clutch, as described later. Plate 98 may be connected by a pivot pin 102 with a disc 103, disc 103 being the first of a series of elements, such as discs 103 to 108, inclusive, respectively connected by successively normally diametrically opposed pivot pins 87′ to 91′, the terminal disc 108 being connected by a pivot pin 109 with a radial flange 110 of shaft 97. Each of the discs 103 to 108 may be provided with a central annular hole 111 having a diameter sufficiently greater than boss 94 to accommodate movement of the discs about the pins and engagement of the edge of each of the respective holes 111 with boss 94, as described below, it being noted that when shaft 97 rotates, the discs 103 to 108, as well as plate 98, will rotate therewith. However, when the brake band 101 is applied to the flange or brake drum 100, as in any suitable conventional manner, the plate 98 will be slowed down and thus cause disc 103 to pivot about pin 87′, in turn causing disc 104 to pivot about pin 88′ and so on, until disc 108 pivots about pin 109. Such movement of the discs will cause the central hole 111 of each disc, as in the position of FIG. 21, to frictionally engage the boss 94, thereby causing shaft 93 to rotate with shaft 97.

Shaft 93 may also be fixed, so that the device may be used as a brake by applying brake band 101, or as a speed limiting brake. For the latter purpose, a belt may be substituted for the brake band 101, or brake band 101 may be used as a belt, to drive plate 98 at a predetermined rotational speed, so that if shaft 97 should increase in speed to above the speed of plate 98, plate 98 will cause discs 103 to 108 to apply a braking effect on shaft 97, so as to decrease the rate of rotation of shaft 97 to that desired. In addition, such a belt may be controlled so that plate 98 will be rotated for a limited number of degrees or turns and the driven shaft will thereby be rotated for the same number of degrees or turns, so that the device becomes a servo-mechanism or may be used as a part thereof.

The brake band 101 may be applied by a centrifugal device, of any suitable conventional construction, and driven by shaft 97, which will apply brake band 101 whenever shaft 97 exceeds a predetermined speed, so that the device will act as a centrifugal brake to slow down shaft 97. It will be noted that the force required to apply such a brake is only a fraction of the braking effect produced, since the Formula I given previously may be utilized to determine the amplification factor, i.e., the ratio between the braking effect on shaft 97, the former corresponding to F and the latter to T in the formula $T=FA$. As before, the braking effect produced on shaft 97 may be increased or decreased in the manner previously indicated.

The device of FIGS. 20 and 21 also may be used as a coupling, as by using either shaft 93 or 97 as a driving shaft and the other shaft as a driven shaft, and providing a braking mechanism, such as by substituting frictional material for the bearing material of collar 99 or using a viscous lubricant between collar 99 and shaft 93 (in which event drum or flange 100 and brake band 101 may be eliminated, if desired) to produce a drag against the rotation of collar 99. Thus, when either shaft rotates in either direction, a braking effect or drag will be produced to cause plate 98 to slow down if shaft 97 rotates or to start rotating with shaft 93 if the latter rotates, which will cause discs 103 to 108 to move and thereby cause the edges of holes 111 to engage boss 94 and cause the opposite shaft to be rotated in the same direction. A similar result may be obtained by mounting a fan on plate 98 of FIG. 20, or on plate 27 of FIG. 2, so that as the driving shaft begins to rotate, the resistance of air to movement of the fan will slow plate 27 or 98 down, thus causing the elements to engage the friction surface. One advantage of such a coupling is that the shafts are not connected together when one shaft starts to rotate, while the rotation of the driven shaft will initially be at a lower rate than the driving shaft, i.e., at the start of rotation and until the discs begin to take hold. Thus, such a coupling is particularly useful where starting torque is a problem, as in the case of an inertia load. As will be evident, the devices of FIGS. 6 or 18 may be used in a similar manner, as by substituting friction material for the bearing material of bearings 32, 32′ or 32″ and also eliminating electromagnetic coils 28, 28′ or 28″, if desired.

As will further be evident, a device of this invention may also be utilized as an overload clutch or to limit torque transmission. Thus, the frictional material, substituted for the bearing material of bearing 32 of FIG. 1, bearing 32′ of FIG. 6, bearing 32″ of FIG. 18, or bearing collar 99 of FIG. 20, or the viscous lubricant used with such bearings, may be selected so that a maximum predetermined actuating torque is produced with a resultant maximum torque transmitted between the driving and the driven shafts. In each case, if the driven shaft, for instance, should be subjected to a torque in excess of that desired, the discs will slip. Such a device would be particularly useful in power driven tools, in which a certain maximum torque should not be exceeded, as in tightening a stud, bolt or the like. Other applications of such a device will, of course, be evident to those skilled in the art. Also, the device of FIG. 2, FIG. 6 or FIG. 18 can be utilized to limit torque transmittal, as by controlling the frictional resistance of plate 27, 27′ or 27″ against the end of the respective flange 18, 18′ or 18″ by controlling the magnetic pull exerted by the electromagnetic coil 28, 28′ or 28″, which is, of course, dependent upon the ampere turns of the magnet. Also, the frictional resistance between the brake band 101 and flange or drum 100 of FIG. 20 which is, of course, dependent upon the force applied to the brake band, may be controlled to limit the torque transmitted.

Figure 22:
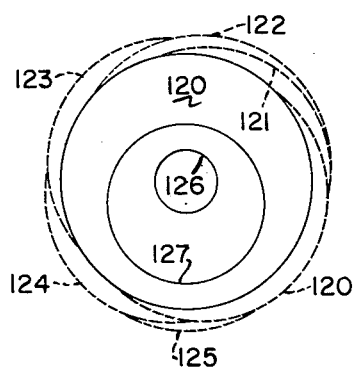
FIG. 22 is an end view of a series of circular plates or discs which may be used in an alternative construction forming a modification of either FIG. 18 or FIG. 20.
Figures 23, 24:
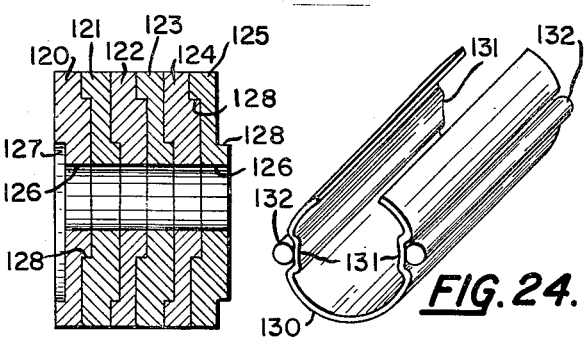
FIG. 23 is a longitudinal section of the discs of FIG. 22.
FIG. 24 is a perspective view of a generally annular, elongated spring which is particularly adapted to be used in connection with the discs of FIGS. 22 and 23.

The alternative discs 120 to 125, inclusive, shown in FIGS. 22 and 23, may be substituted for the discs of FIG. 2, FIG. 18 or FIG. 20, in order to eliminate the necessity for pin connections between the discs. Thus, each of the discs may be provided with a central axial hole 126, an annular well 127 which is offset from the center of the disc, and a correspondingly shaped axially extending, offset boss 128 on the opposite side. As will be evident from FIG. 23, the discs 120 to 125 will fit together in the manner shown, with the boss 128 of one disc fitting into the well 127 of the next adjacent disc. The plate by which the discs are controlled and the shaft flange or the like which is driven by or which drives the discs, may have a similar off-center boss, or may be connected by a pivot pin to the first disc 120 and the last disc 125, respectively. As will be evident, upon pivotal movement of disc 120 relative to disc 121, disc 121 will move to the dotted position of FIG. 22, and the remaining discs will move in turn, such as out to the respective dotted positions of FIG. 22. Such movement will, in effect, increase the effective outer diameter of the series of discs and cause the outer edges thereof to engage the inner surface of flange 18 or 18" when the discs of FIG. 23 are substituted for the discs of FIG. 2 or FIG. 18. Similarly, such movement will cause the effective inner diameter of holes 126 to decrease, as when the discs of FIG. 23 are substituted for the discs of FIG. 20. In each instance, the discs will engage a flange or boss, respectively, to cause a second shaft to be driven from a driving shaft, or to cause a braking effect to be produced, or other desired result.

Particularly when the elements of FIGS. 22 and 23 are substituted for the discs of the device of FIG. 2, or of FIG. 18, a spring 130 of FIG. 24 which is made of any suitable spring material and may be generally arcuate, may be inserted within the central holes 126 of discs 120 to 125, to maintain the discs in centered position when plate 27 of FIG. 2 for instance, is not actuated. Spring 130 may have a length equivalent to the lateral length of the assembled discs and also be provided at each side with a longitudinally disposed, circumferentially extending indentation or inwardly offset segment 131 in each of which a roller 132 may be located, so as to reduce the frictional resistance of the spring to the pivotal movement of the discs relative to each other. As will be evident, when the discs are pivoted, such as to the dotted positions of FIG. 22, spring 130 will be compressed, but when the actuating force is removed, spring 130 will return the discs to their rest position, since the radial thrust of spring 130 will tend to cause the discs to pivot back again to a position in which all of central holes 126 are in alignment. When spring 130 is utilized, holes 126 are, of course, made sufficiently larger than the shaft passing therethrough that sufficient clearance for the spring is provided.

Figure 25:
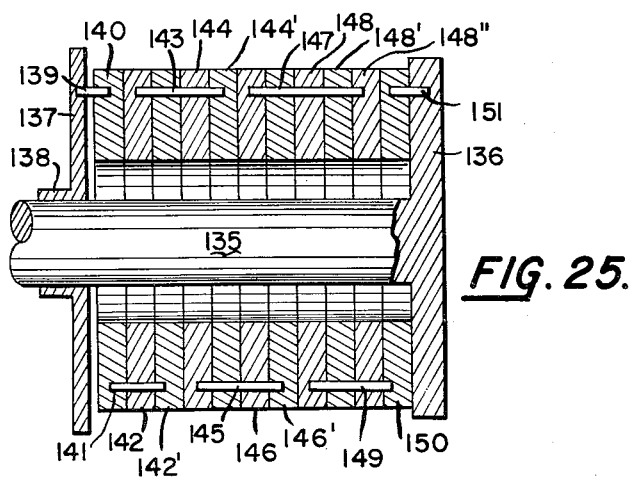
FIG. 25 is a longitudinal section of a portion of a clutch, illustrating another modification thereof, similar to a portion of FIG. 18 but applicable to other types of discs or elements.

In each of the embodiments illustrated in FIGS. 2, 6, 18 and 20, each element having a friction edge is similar to the other elements of a series, thus having a similar bearing surface at the friction edge, although, as has been indicated previously a combination of different elements may be used to produce a variation in the individual amplication factors of the elements. However, a series of discs or the like may be used, in which two or more discs are attached together to form an individual element, thereby utilizing the same discs but a different number thereof for individual elements. As illustrated in FIG. 25, a shaft 135 may be provided with a radial flange 136 while an annular plate 137, spaced axially from flange 136, may be provided with a bearing collar 138 for axial and radial movement along shaft 135, the plate 137 rotating with shaft 135, if the driving shaft, but being capable of being slowed down in a manner similar to plate 27 of FIG. 2, if shaft 135 is the driven shaft. Suitable means are provided for moving plate 137, or slowing it down, as in a manner similar to plate 27" of FIG. 18. A pin 139 pivotally connects plate 137 with a single disc 140, while a pin 141 pivotally connects disc 140 with a pair of discs 142 and 142', it being noted that pin 141 conveniently extends through disc 142 into disc 142', so that discs 142 and 142' will move in unison. Discs 142 and 142' act as a single element, since the opposite pin 143 extends through disc 142' into disc 142 and pivotally connects the pair of discs 142 and 142' with another pair of discs 144 and 144', the pin 143 conveniently extending through disc 144 into disc 144'. The next opposite pin 145 connects discs 144 and 144' with a suceeding pair of discs 146 and 146', pin 145 conveniently extending through disc 144' into disc 144 and also through disc 146 into disc 146', so that each pair of discs will act in unison. The next opposite pin 147, which extends through disc 146' into disc 146 connects the latter pair of discs with three discs 148, 148' and 148", these three discs acting as a single element and the pin 147 extending through disc 148 and disc 148' into disc 148". The opposite pin 149, which conveniently extends through disc 148" and disc 148' into disc 148, to lock the three discs together, pivotally connects the three discs with a single disc 150, which in turn is pivotally connected by a pin 151 with flange 136. To recapitulate, pin 139 provides a pivotal connection between plate 137 and disc 140; pin 141 provides a pivotal connection between disc 140 and the pair of discs 142 and 142'; pin 143 provides a pivotal connection between the pair of discs 142 and 142' and the pair of discs 144 and 144'; pin 145 provides a pivotal connection between the pair of discs 144 and 144' and the pair of discs 146 and 146'; the pin 147 provides a pivotal connection between the pair of discs 146 and 146' and the three discs 148, 148' and 148"; the pin 149 provides a pivotal connection between the three discs 148, 148' and 148" and the single disc 150; and the pin 151 provides a pivotal connection between disc 150 and flange 136. As will be evident, although there are eleven discs shown in FIG. 25, there are actually only six elements. Thus, either one, two or three discs, or more, if desired, may be used as a single element, so that the various elements will have different bearing areas provided by the friction edges thereof and it will be understood that other arrangements of single and multiple discs to form the elements may be utilized. One advantage of such a construction is that by using additional discs in a single element, the multiple discs will have sufficient area to handle the load without undue wear or heating.

The device of this invention is also adapted to be utilized as a single or partial revolution clutch. For instance, the switch which controls electricity supplied to the electromagnetic coil 28, 28' or 28" of FIGS. 2, 6 or 18, may be placed in such a position that when the driven shaft makes one revolution, or a part of a revolution, a projecting pin or the like on the driven shaft will open the switch, thereby deenergizing the electromagnetic coil and releasing the control plate. In such an instance, it might be desirable to place a small coil spring around shaft 10 of FIG. 2, for instance, between plate 27 and disc 20, so that when the supply of electricity to the electromagnetic coil is terminated, plate 27 will be moved by the spring away from the end of flange 18, thereby insuring a quicker disengagement of the clutch. The means for applying brake band 101 to the flange or drum 100 of FIG. 20, whether electrically or mechanically controlled, can be similarly deactuated by a projecting pin or the like, mounted on the driven shaft.

As will be evident, the device of this invention is a torque amplifier and may be utilized as such, since the torque necessary to actuate the device may be relatively small, compared with the torque transmitted between the driving and driven shafts when the elements are in motion transmittal position. Thus, a relatively small torque or force, used to turn or to impede the rotation of an actuating plate, may be multiplied many times.

As will be evident, centrifugal force is ordinarily a negligible factor and does not tend to cause the elements of the device of this invention to engage or to disengage. Of course, annular discs, as in the embodiments of FIGS. 2, 18, 20, 23 and 25 are not affected by centrifugal force, since the center of gravity thereof is at approximately the center of rotation. Also, the center of gravity of the elements of FIGS. 7, 9, 10 and 11, will be relatively close to a line connecting the holes for the pins 43, so that any centrifugal force produced will not tend materially to move the discs, since a generally circumferentially applied force, at one of the pins 43, is necessary for the same. Again, the center of gravity of the elements 67 of FIG. 14 will be relatively close to a line drawn between the pin holes 68 and 69, so that centrifugal force is, for similar reasons, a negligible factor. Although the center of gravity of the elements 60 of FIG. 12 will be slightly to one side of a line drawn between pin holes 63 and 63', the moment produced by centrifugal force is relatively small, so that again, centrifugal force will be a negligible factor. Also, in the case of the element 70 of FIG. 17, the center of gravity will be only slightly displaced from a line drawn between the pin hole 74 and slot 75, so that the moment is again relatively small and centrifugal force will be a comparatively negligible factor. Of course, if centrifugal force is found to be an undesirable factor, in the case of element 60 of FIG. 12 or element 70 of FIG. 17, the same can be overcome by providing additional material extending to the opposite side of the element from the lateral flange 64 of FIG. 12 or the lugs 71 and 72 of FIG. 17.

From the foregoing, it will be evident that the motion or torque transmitting device of this invention fulfills to a marked degree the requirements and objects hereinbefore set forth. The device may be used as a clutch, brake, coupling, etc., and also as various types of clutches, brakes and couplings, in the manner described. The parts are relatively simple and thus economical to produce, but are effective in operation, since the actuating torque or force is but a fraction of the transmitted torque. Although several different embodiments of this invention have been illustrated and described and various changes therein indicated, it will be understood that other embodiments may exist and additional changes made therein, without departing from the spirit and scope of this invention.

What is claimed is:

1. In a device for transmitting motion or torque between two substantially coaxial members at least one of which is rotatable, the improvement comprising a series of generally flat elements mounted in side by side relation for at least limited rotation generally about a common axis, each of said elements having at least one friction edge; a connection spaced from said axis and between the last element of said series and one of said members; connections spaced from said axis and between successive elements of said series for producing displacement in at least a generally radial direction of each element with respect to said axis; a cylindrical friction surface connected to the other of said members and engageable by said friction edges of said elements upon such displacement of said elements; an axially movable plate pivotally connected to the first of said series of elements; a second friction surface rotatable with said cylindrical friction surface; and means for moving said plate into engagement with said second friction surface.

2. A device as defined in claim 1, wherein said connections between said elements are pivotal connections.

3. A device as defined in claim 2, wherein said pivotal connections between successive elements are disposed in successive, generally diametrically opposite positions.

4. A device as defined in claim 2, wherein said pivotal connections include pins, each pin connecting one said element with the next adjacent element.

5. A device as defined in claim 2, wherein said pivotal connections include a laterally extending portion of one element and a recess in the next adjacent element in which said laterally extending portion fits, said laterally extending portions and recesses having edges which form at least a part of a circle.

6. A device as defined in claim 1, wherein said cylindrical friction surface surrounds said elements.

7. A device as defined in claim 1, wherein said elements surround said cylindrical friction surface.

8. A device as defined in claim 1, wherein each of said elements comprises a disc having a circular outer friction edge.

9. A device as defined in claim 1, wherein each said element is provided with a circular hole in the center to provide an inner circular friction edge.

10. A device as defined in claim 1, wherein said elements are non-circular and provided with at least one generally arcuate friction edge of limited circumferential extent.

11. A device as defined in claim 10, wherein substantially each of said elements is provided with a single friction edge disposed at one side of the connection to the next successive element and engageable with said cylindrical friction surface upon displacement of said element in one direction.

12. A device as defined in claim 10, wherein substantially each of said elements is provided with a friction edge on each side of the connection to the next successive element, said friction edge on one side being engageable with said cylindrical friction surface upon displacement of said element in one direction and said friction edge on the other side being engageable with said cylindrical friction surface upon displacement of said element in a generally opposite direction.

13. A device as defined in claim 10, wherein substantially each of said elements is provided with at least two circumferentially spaced friction edges on the same side of the connection to the next successive element and substantially simultaneously engageable wtih said cylindrical friction surface upon displacement of said element in one direction.

14. A device as defined in claim 1, wherein said plate is formed of magnetic material; and said plate moving means operates magnetically.

15. A device as defined in claim 1, wherein each of said elements is provided with a central axial circular hole therein and an outer peripheral surface forming a friction edge, said cylindrical friction surface surrounding said elements; and including a generally arcuate member formed of resilient material and disposed within the central holes in said elements, said resilient member having two oppositely disposed, longitudinally extending, inwardly offset segments; and a cylindrical roller disposed longitudinally in each segment, each said segment having sufficient width to accommodate circumferential movement of the corresponding roller, said rollers engaging the periphery of said central holes of said elements and said resilient member being compressed upon displacement of said elements, said resilient member tending to move said elements to a position in which said central holes are in alignment.

16. A device for transmitting motion or torque between first and second substantially coaxial rotatable shafts, comprising a series of generally flat disc like elements having circular inner and outer peripheries and mounted in side by side relation for rotation about the axis of said shafts, said elements having on one side a laterally extending lug having an arcuate periphery and on the opposite side a recess having an inner periphery corresponding to the lug of the adjacent element, a lug of one element engaging the recess of an adjacent element; a radial flange on said first shaft and provided at its outer edge with an axially extending cylindrical flange whose inner periphery provides a cylindrical friction surface surrounding said elements; a radial flange on said second shaft adjacent said radial flange on said first shaft; a pin pivotally connecting the element at one end of said series with said radial flange on said second shaft; a flat, annular plate formed of magnetic material and mounted for rotation about said second shaft and movable axially in relation thereto, said plate being disposed adjacent the element at the opposite end of said series; a pin pivotally connecting said plate with said element at said opposite end of said series; and an electromagnetic coil surrounding said cylindrical flange adjacent the end thereof, for moving said plate into frictional engagement with the end of said cylindrical flange.

17. A device for transmitting motion or torque between first and second substantially coaxial, rotatable shafts, the ends of said shafts being disposed in spaced axial relation, comprising a radial flange mounted on said first shaft and provided with a cylindrical flange extending axially toward said second shaft, said first shaft having an axial extension adjacent the radial flange thereof; a series of generally flat elements disposed within said cylindrical flange and mounted in side by side relation, for rotation generally about the axis of said shafts, each said element having at least one friction edge for engaging the inner periphery of said cylindrical flange upon radial and circumferential displacement of said element relative to said axis; a series of pins, disposed in diametrically opposite positions, pivotally connecting each element with the next adjacent element; a flat annular plate formed of magnetic material and rotatable about said axial extension of said first shaft; a bearing for said plate and engaging said axial extension, so that said plate may rotate and also move axially relative to said axial extension; a pin pivotally connecting said plate with the element adjacent thereto; an electromagnetic coil disposed adjacent said radial flange of said first shaft for moving said plate into engagement with said radial flange of said first shaft; a radial flange mounted on said second shaft adjacent the end of said cylindrical flange of said first shaft; and a pin pivotally connecting said radial flange of said second shaft with the element adjacent thereto.

18. A device as defined in claim 17, wherein each said element is provided with a leg having adjacent its outer end a hole for receiving a pin connecting said element with the next previous element in said series or said plate and a hole disposed diametrically opposite said first hole for receiving a pin connecting said element with the next element in series or said second shaft flange; and a pair of angular lugs extending in generally opposite directions adjacent said second hole and each provided with an outer friction edge, said friction edge of one lug engaging the inner periphery of said cylindrical flange upon movement of said element in one direction and the friction edge of the opposite lug engaging the inner periphery of said cylindrical flange upon movement of said element in the opposite direction.

19. A device as defined in claim 17, wherein each said element is provided with a hole to receive the pin connecting said element with the next previous element in series or said plate and an oppositely disposed slot for receiving the pin connecting said element with the next element in series or said second shaft flange; and a pair of angularly extending lugs disposed on the same side of said element and each having an arcuate friction edge adapted to engage the inner periphery of said cylindrical surface.

20. A device for transmitting motion or torque between first and second substantially coaxial rotatable shafts, comprising a radial flange on said first shaft having at its outer edge an axially extending cylindrical flange; a radial flange on said second shaft adjacent said radial flange of said first shaft; a series of flat, annular discs each having a circular inner and outer periphery disposed in side by side relation surrounding said first shaft and within said cylindrical flange; a pin pivotally connecting said radial flange of said second shaft with the disc adjacent thereto; a series of pins disposed in diametrically opposite positions and each connecting one said element with the next successive element in said series; a flat plate formed of magnetic material and having a hole in the center, said plate being adjacent the open end of said cylindrical flange; bearing means for said plate so that said plate is rotatable about said second shaft and also movable axially thereof; a pin pivotally connecting said plate with the adjacent disc; and an electromagnetic coil surrounding said cylindrical flange adjacent the outer end thereof for moving said plate into engagement with the end of said cylindrical flange.

References Cited in the file of this patent

UNITED STATES PATENTS

| | | |
|---|---|---|
| 817,210 | Williams | Apr. 10, 1906 |

FOREIGN PATENTS

| | | |
|---|---|---|
| 286,475 | Germany | Aug. 14, 1915 |
| 334,377 | Germany | Mar. 12, 1921 |
| 433,886 | Germany | Sept. 10, 1926 |